United States Patent [19]

Smith, III et al.

[11] 4,360,808

[45] Nov. 23, 1982

[54] RADIO CONTROL APPARATUS WITH VOICE TRANSMISSION CAPABILITY

[75] Inventors: Jay Smith, III, Pacific Palisades; Jeffrey M. Moskin, Los Angeles, both of Calif.

[73] Assignee: Smith Engineering, Santa Monica, Calif.

[21] Appl. No.: 115,457

[22] Filed: Jan. 25, 1980

[51] Int. Cl.$^{3}$ .................... G08C 19/00; H04Q 7/02; A63H 30/04

[52] U.S. Cl. .................... 340/825.69; 340/825.72; 340/825.76; 340/696; 340/539; 340/636; 455/61; 455/228; 180/167; 46/254; 318/16; 318/581

[58] Field of Search .................... 340/694–696, 340/163, 164 R, 167 R, 167 A, 539, 636, 345, 348, 349, 350, 825.76, 77.16, 77.17, 825.06, 825.39, 825.4, 825.42, 825.43, 825.44, 635, 825.69–825.72; 455/352, 353, 100, 102, 95, 116, 227–229, 58, 61, 68, 140; 46/254, 253; 180/167, 168; 318/11, 16, 563, 565, 581, 257, 268, 301, 305, 312, 311, 318

[56] References Cited

U.S. PATENT DOCUMENTS 2,527,561 10/1950 Mayle .................... 455/352

3,482,046 12/1969 Hughson et al. .................... 340/695

3,522,481 8/1970 Terzic .................... 340/636

3,668,526 6/1972 Raskin .................... 455/58

3,806,939 4/1974 Palmieri .................... 340/695

4,006,447 2/1977 Narbaits-Jaureguy .................... 455/140

4,019,142 4/1977 Wycoff .................... 455/352

4,080,602 3/1978 Hattori et al. .................... 455/352

*Primary Examiner*—James J. Groody
*Assistant Examiner*—Donnie Lee Crosland
*Attorney, Agent, or Firm*—Jackson, Jones & Price

[57] ABSTRACT

A radio controller for radio control of model vehicles and the like. The controller can be placed in a control mode wherein vehicle functions such as motor speed, direction, horn and lights are controlled by control signals. In addition, the controller can be placed in a voice transmission mode wherein an audio signal is transmitted to the vehicle and broadcast from a speaker mounted on the vehicle. The receiver of the radio controller is switched from the control mode to the voice transmission mode by way of the control signals. When the receiver is placed in the voice transmission mode, the control signals are ignored with switching to the control mode being accomplished by receiver circuitry which detects a momentary absence of the transmitted carrier signal.

16 Claims, 2 Drawing Figures

RADIO CONTROL APPARATUS WITH VOICE TRANSMISSION CAPABILITY

BACKGROUND OF THE INVENTION

1. Field of the Invention

The field of the present invention relates to remote control of apparatus via radio control, and more particularly to radio controlled toy vehicles and the like.

2. Description of the Prior Art

A hobby which is growing in popularity is that of a powered model vehicle wherein the vehicle is driven by an electric motor powered by a battery or by a small engine. It is old in the art to use remote control apparatus for remotely controlling the speed and the steering of model cars. One popular way of doing this by radio control apparatus which controls the speed of the motor driving the car and which controls the steering of the car.

The prior art control mechanisms, while providing some realism in allowing the operator to control the speed and direction of the toy vehicle, do not provide any further control for the operator. Therefore, the realism of the remote operation is substantially reduced. None of the prior art systems within the knowledge of the applicants provide any further control over the vehicle and its ancillary equipment, such as for example horn, siren, lights and the like.

The prior art known to applicants is also devoid of the capability of using the remote control apparatus to transmit voice communication. Such a feature would substantially increase the communication capability of the apparatus.

SUMMARY OF THE INVENTION

An apparatus for radio control of equipment such as powered model vehicles is disclosed. The apparatus is operable in a control mode for conveying control signals to the vehicle for control of such functions as motor speed, steering wheels position, lights, horn, and the like. In this mode an RF carrier is pulse modulated with the control information. The apparatus is operable in a voice transmission mode for transmission of audio voice signals between the transmitter and receiver of the apparatus. In this mode, the RF carrier is amplitude modulated. The mode of operation is selectable by operator control. A control signal is transmitted by the apparatus operating in the control mode which places the receiver in a mode for detecting voice transmission. The receiver is latched in this mode and will not decode any control information until the latch is reset by a signal generated by loss of the RF carrier.

Other features and improvements are disclosed.

DETAILED DESCRIPTION OF THE INVENTION

The present invention relates to radio control apparatus. As is well known, a transmitter is used for transmitting an RF carrier signal which is remotely received by an RF receiver. In the preferred embodiment disclosed herein, a plurality of control signals are transmitted via the RF carrier signal, which transmits a succession of data "frames". Each information "frame" is divided into six control data "channels". Thus, as will be explained in detail hereinbelow, for each frame control information may be transmitted concerning six separate functions. The apparatus is also adapted for voice transmission, and is operable in two separate modes, the "control" mode for providing control signals, and the "voice" mode for transmission of voice signals. One of the novel aspects of the present invention is the use of one "channel" to provide a signal for disabling the normal function of the receiver of receiving control signals, and latching the receiver in a mode for receiving and detecting amplitude modulated carrier signals for voice transmission.

The radio control apparatus of the present invention is ideally suited for applications in the model vehicle field, e.g. cars, planes and like. The apparatus is adapted to provide a plurality of control signals for controlling the various functions of operation of these model vehicles and further is adapted to provide another highly desirable feature, that of voice transmission.

The novel features which are considered as characteristics of the invention are set forth in particular in the appended claims. The invention itself, however, both as to its construction and operation, together with additional objects and advantages there of, will be best understood from the following description of the preferred embodiment. Other embodiments carrying out the principles of the subject invention will readily be apparent to those skilled in the art, and the present invention is not intended to be limited to the disclosed embodiment.

The transmitter is readily adapted to be contained in a small, portable hand-held unit which may be powered by a battery voltage source. The transmitter preferably has operator controls for enabling power to the transmitter and for controlling the various other functions which will be described hereinbelow.

Figure 1:
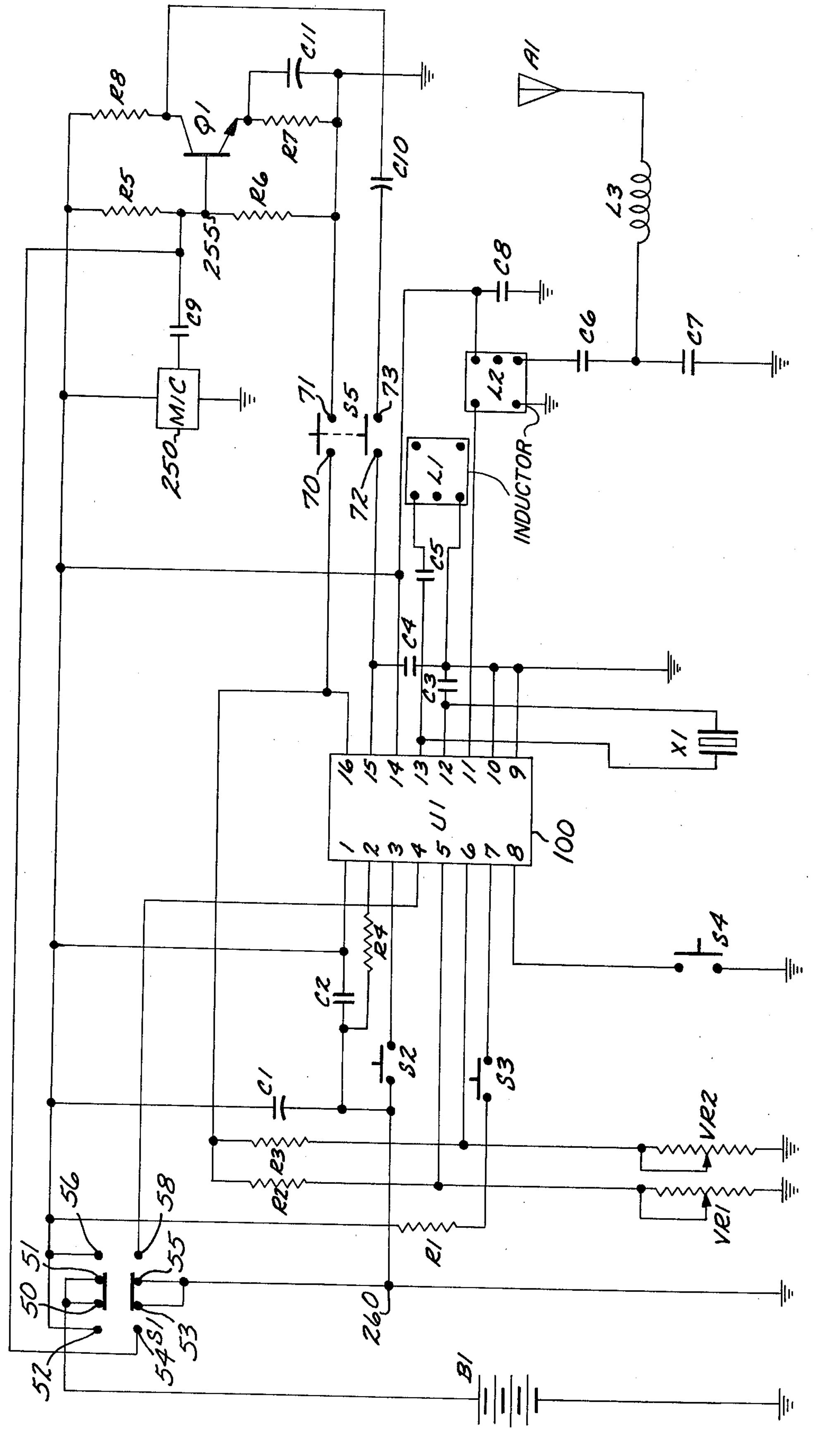
FIG. 1 is a detailed schematic drawing of the preferred embodiment of the transmitter of the present invention.

Referring now to FIG. 1, the detailed schematic diagram of the radio controlled transmitter is shown. Chip 100 is a Texas Instrument, Inc. integrated circuit model number TI SN 76605N, which contains all circuitry for generating an RF carrier at 49 MHz and also for providing the means for modulating the carrier with control information. In the preferred embodiment the "control mode" modulation technique utilized is what may be called "pulse modulation" of the RF carrier. This modulation technique is a time domain technique, wherein a stream of data frames are generated which includes six control signal channels. Each frame is approximately 20 milliseconds in length, and the frame rate is accordingly 50 Hz. Each frame is initiated by a synchronization pulse or burst of the carrier which is approximately 5 milliseconds in length. These 6 information channels follow the synchronization pulse with gaps of approximately 350 microseconds separating each channel. The gaps then comprise time periods when the carrier is turned off.

Within each channel, the length of the RF carrier pulse within a channel may be from approximately 1 millisecond to 2 milliseconds in duration, in dependance upon the value of the control signal to be transmitted. The length of the pulse is detected in the receiver decoder and information relating to the length of the RF pulse of each channel is recovered at the receiver. The information can be decoded either in digital form, i.e. as either a "high" or "low" signal, or in analog form, i.e., proportional to the length of the pulse.

Chip 100 is a commercially available integrated circuit chip containing all circuitry for generating the RF carrier, pulse modulating the carrier and has a capability which allows the carrier to be selectively amptitude modulated by an external input.

Referring now to the terminals identified by reference numerals within the outlined chip 100 in FIG. 1, terminal 1 receives the electrical power necessary to operate the chip. Terminal 2 is coupled to resistor R4 which is a reference setting resistor. Terminals 3 through 8 of chip 100 comprise the input data terminals for receiving the control data to be transmitted over the six channels of the transmitter. Terminal 16 of chip 100 is normally a biasing point, at an internally regulated voltage of 2 volts. When terminal 16 is grounded, however, the pulse modulation capability of the chip 100 is disenabled, and the internal circuitry of the chip 100 is adapted to allow the RF carrier to be amplitude modulated by the signal present at terminal 15 of chip 100. Crystal oscillator X1 is connected across terminals 12 and 13 of the chip for referencing the RF carrier. Coil L1 is a resonating coil used to ensure that oscillator X1 oscillates at the proper harmonic frequency.

Terminal 11 provides the RF output and is connected to the antenna A1 via output coil L2, capacitor C6 and loading coil L3. The loading coil L3 operates to tune out the capacitive reactance of the antenna A1.

Operator control of the transmitter is achieved in the following manner. Switch S1 is a three position, multicontact slide switch, having contacts 50–58 inclusive. In the "off" position, contacts 50 and 51 are coupled together, and contacts 53 and 55 are coupled together. In a second position, contacts 50 and 52 are coupled together, and contacts 53 and 54 are coupled together. In this position, the battery B1 is applied to terminals 1 and 14 of the chip, to the microphone 250 and resistors R5 and R8. Node 255 will also be coupled to node 260.

In a third position, the battery voltage is also applied to terminals 1 and 14 and to microphone 250 and R5 and R8. Terminal 4 of the chip will be coupled to ground.

Switch S2 provides the control signal for the first channel of the data frame. The preferred embodiment shown is adapted for use with a radio controlled model vehicle such as a car and has the capability for switching on and off a horn, siren, lights, and for providing steering and speed control. In the embodiment shown, switch S2 is coupled to terminal 3 of the chip. This is a single pole, single throw switch which when closed, couples terminal 3 to ground. The magnitude of the potential at terminals 3 through 8 determines the pulse length for the respective channels, the nearer to the ground potential, the shorter the RF pulse for the particular channel of the frame. Therefore, when switch S2 is closed, terminal 3 is grounded, and the minimum length RF pulse is applied in the respective frame, which in this case would be frame 1. This would result in RF pulse of approximately 1 millisecond in duration for the channel.

Terminal 4 of chip 100 is coupled to contact 58 of switch S1. When switch S1 is in the "voice transmit" mode, contacts 55 and 58 will be coupled. This will couple terminal 4 of chip 100 to ground causing a minimum length RF pulse to be transmitted for the next frame. As will be described fully with respect to the receiver section, the channel controlled by terminal 4 is used as the "voice transmit" mode selector.

Terminals 5 and 6 of chip 100 are respectively coupled to variable resistors VR1 and VR2 as well as swamping resistors R2 and R3 which in turn respectively couple these terminals to biasing terminal 16 of the chip. Operation of the variable resistors VR1 and VR2 will determine the voltage potential at terminals 5 and 6 and therefore the RF pulse length for the two channels corresponding thereto. The channels controlled by digital information, i.e. "on" or "off" states. For the radio controlled car application terminal 5 and variable resistor VR1 control the steering wheels, and terminal 6 and VR2 control the motor speed of the electrical motor driving the model car.

Terminals 7 and 8 of the chip 100 control two additional channels which are used as digital "on/off" channels. Switch S3 is a single pole-single throw switch, one side coupled to terminal 7, and the other side coupled via resistor R1 to contacts 56 and 52 of switch S1. Therefore, when either of terminals 56 or 58 is coupled to the battery voltage (by the appropriate disposition of switch S1) a "high" state may be generated at the terminal 7, and a maximum length R1 pulse generated for that channel of the frame. For the toy car application which is the subject for the preferred embodiment, switch S3 may be used to turn "on" and "off" a "siren" in the model car.

Switch S4 couples terminal 8 of chip 100 to ground. With switch S4 in the "open" state, maximum length RF pulse will be generated, and with S4 closed, terminal 8 is at ground potential, causing a minimum length RF pulse to be generated for the corresponding channel of the frame. This channel is used to control lights on the model car.

As will be described more fully hereinbelow, in the discussion concerning the receiver section, the radio control apparatus of the present invention has two modes, a "control" mode for controlling the car, and a "voice transmit" mode for voice transmission. Switch S1 is used to select the desired mode. With terminals 51 and 56 coupled together, and terminals 55 and 58 coupled together, the transmitter is in the mode for voice transmission, although control signals will continue to be transmitted until switch S5 is actuated. When terminals 50 and 52 are coupled together and terminals 53 and 54, the transmitter is in a "control" mode, wherein the control signals for controlling various functions of the car are operational. When in the "voice transmit" mode, terminal 4 of the chip is grounded. The operator may place the transmitter in the "ready" mode by depressing switch S5, which is a double pole, single throw switch adapted for coupling contacts 70 and 71 together and coupling contacts 72 and 73 together. Once switch S5 is closed, terminal 72 and 73 are coupled together, coupling the output of the common emitter R5, R6, R7, R8 to the terminal 15. The FET condensor microphone 250 is capacitively coupled to the input of the amplifier at node 255. The operator by speaking into the microphone is then able to generate an audio signal which is used to amplitude modulate the RF carrier.

This completes the discussion of the transmitter section shown in FIG. 1. In summary, the transmitter comprises a dual mode transmitter, having a "control" mode and a "voice transmit" mode. When in the "control" mode, the carrier is pulse modulated to code the information which is carried by the individual frames of the data stream. In the "voice transmit" mode, the pulse modulation capability is disenabled, and the RF carrier is amplitude modulated by the audio signal to be transmitted.

Figure 2:
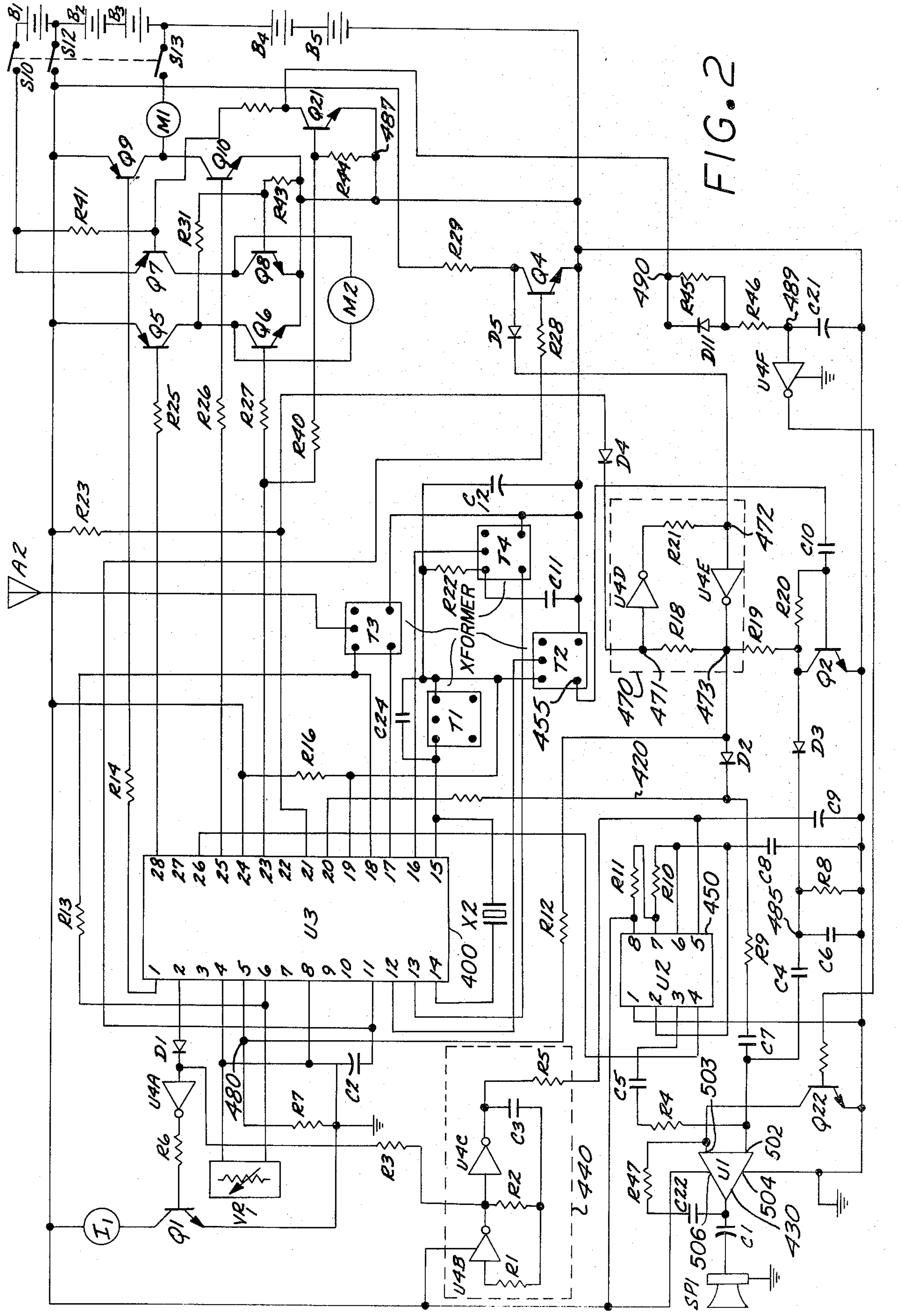
FIG. 2 is a detailed schematic drawing of the preferred embodiment of the receiver of the present invention.

Referring now to FIG. 2, the preferred embodiment of the receiver apparatus is disclosed. This preferred embodiment utilizes a Texas Instruments type TI SN 76606N chip 400 which is the mate to the transmitter chip 100. This chip is an integrated circuit containing all of the circuitry necessary to receive, demodulate and detect the RF transmitted signal. The receiver receives the pulse modulated RF and uses a counter to determine the length of each pulse corresponding the respective channel. Depending upon the type of information carried by the respective channels, decoders are employed to retrieve digital "on/off" data and analog data proportional to the length of the particular RF pulse.

The receiver operates on the well-known superheterodyne principle, with an intermediate frequency ("IF") of 455 KHz. This "difference" signal is amplified in the IF stage with an amplifier having automatic gain control so that the amplitude of the IF signal available for detection is relatively constant.

The manner of receiving, mixing with IF, detecting and decoding the received signal is old in the art, and will not be described. It is sufficient to note that the encoded information is decoded in the receiver and is available at appropriate terminals of chip 400.

Terminal 2 of chip 400 controls lights I1 (which may be headlights, flashing lights or the like). A "low" signal at terminal 2 is inverted by invertor U4A and the resultant "high" inventor output signal turns transistor Q1 "on" and therefore also light I1.

Terminal 20 provides a "horn" signal (internally generated in chip 400) which is coupled via line 420 to terminal 502 of amplifier 430 (which in the preferred embodiment comprises a type LM386 power amplifier). Hence the state of terminal 20 is responsive to the state of switch S2 of the transmitter.

Oscillator 450 (an LM 555 timer used as an oscillator) with associated resistances and capacitors and the circuit elements enclosed within phantom line 440, together function to generate an audio signal which when amplified simulates a "siren" sound. Terminal 26 enables oscillator 440. The method of operation of these circuit elements is apparent to those skilled in the art and will not be described in detail. Generally, invertors U4B and U4C together with resistors R1 and R2 and capacitor C3 operate as a very low frequency oscillator (approximately 2 Hz) which is filtered by resistor R5 and capacitor C9 which smooths the output into a "triangle" wave which is applied to terminal 5 of oscillator 450. Oscillator 450 is a voltage controlled oscillator and terminal 5 is the control pin. The output of oscillator 450 is coupled to terminal 503 of amplifier 430. The output of amplifier 450 is coupled to speaker SP1.

Chip 400 provides control signals to steering motor M1 which is coupled to the front wheels of the model vehicle for turning the wheels to control the direction of movement. The direction of rotation of the motor M1 depends upon which of drive transistors Q9 or Q10 is gated "on". Terminal 1 of chip 400 is a gated current "sink", i.e. the "on" or active condition is at ground potential, and the terminal 1 draws current when active. Therefore when terminal 1 is active, PNP transistor Q9 is gated on. Terminal 25 is a current source, i.e. when active, the terminal is at the "high" state. The terminal is coupled to Q10 for driving the steering motor M1 in the opposite direction as driven by Q9.

Variable resistance VR1 is coupled across terminals 4 and 6. There is physical coupling between the steering wheels and variable resistor VR1 such that VR1 is adjusted by movement of the wheels. The variable resistor VR1 is used as part of a position servo which allows the steering wheels to be properly controlled. Such position servos are old in the art and need not be described in detail. Chip 400 provides the circuitry necessary for the function of the position servo.

Terminals 23 and 28 provide the current source and sink for gating the drive motor M2. Transistor Q5, Q6, Q7 and Q8 comprise a transistor bridge for driving motor M2. When terminal 23 is active, transistors Q6 and Q7 are gated on, and the motor driven to propel the model vehicle forward. When terminal 28 is active, transistors Q5 and Q8 will be gated on, an the motor driven in the reverse direction. The speed of the motor is controlled by gating of the drive transistors; to drive the motor at maximum forward speed; for example, Q6 and Q7 will be gated "on" 100% of the time. For $\frac{1}{4}$ speed, Q6 and Q7 will be gated on only 25% of the time.

The model vehicle is driven by five battery cells B1–B5, which are connected to the circuit by manually controlled switches S10, S11 and S12.

Crystal X2 is connected across terminals 14 and 15 of chip 400. The tuned circuit comprising C24 and oscillator transformer T1 ensures that an IF mixing signal of 455 KHz is obtained. Receive antenna A2 is coupled through the antenna transformer coil T3 to terminal 17 of chip 400, which provides the RF input to the mixer. The mixer output appears at terminal 15 and is coupled to the tuned circuit of C24 and T1 to the mixer transformer coil T4. The signal at terminal 455 comprises the "difference" signal of the mixed IF signal. Terminal 455 is coupled via capacitor C10 to the base of transistor Q2.

Referring now to the circuit elements within phantom lines 470, these circuit elements comprise a latch circuit. The control signal to the latch is provided by terminal 21 of chip 400, which is coupled via diode D4 to node 471 at the input to inverter U4D.

The state of terminal 21 is dependent upon the selected mode of operation of the radio control apparatus. If in the "control" mode, terminal 21 is inactive and in the "low" state. With terminal 21 low, node 471 will be "low", terminal 472 will be "high", and node 473 will be "low", at ground potential. With node 473 "low", transistor Q2 will be biased "off".

Resistors R7 and R12 are coupled to node 480 and terminal 5 of chip 400. The resistance from terminal 5 to ground provides the reference resistance for the reference oscillator used in the pulse modulation decoder section of chip 400. With node 473 at ground, the effective reference resistance is the parallel connection of R7 and R12. These resistors have the same resistance value, selected such that their parallel connection provides the optimum reference resistance level for proper reference oscillator operation.

When the apparatus is in the "voice transmit" mode, terminal 21 of chip 400 will be "high", resulting in a "high" state at node 473. Node 473 is coupled to node 471 via resistor R18; the "high" state at node 473 will hold node 471 at the "high" state also, and that a subsequent change of state at terminal 21 of chip 400 will not affect the condition of the latch, due to the back-biasing effect of diode D4.

When terminal 473 is "high", the effective resistance presented to terminal 5 of the chip is no longer the parallel connection of R7 and R12, but rather a "high"

potential is coupled to the terminal via R12. This change in effective resistance causes the reference oscillator to become inoperative, which disables any decoding of control signals. Hence, the car motors will no longer be operable.

With the apparatus in this "voice transmit" mode, the RF carrier may be amplitude modulated by the audio signal from the microphone 250, if switch S3 is closed (FIG. 1). The IF "difference" signal at terminal 455 of transformer coil T2 is amplitude modulated with that audio signal, and coupled to the base of transistor Q2 via capacitor C10.

With node 473 in the "high" state, Q2 is biased "on", and acts as an amplifier stage to amplify the voice modulated signal. Diode D3 operates as a peak detector, and the network of R8 (150 Kohms) and capacitor C6 (0.005 microfarads) filters the detected signal to provide an envelope signal (i.e. the audio voice signal) at node 485. The audio voice signal is coupled to terminal T2 of amplifier 430, amplified and provided to the speaker SP1.

The latch 470 operates to prevent any control signal decoding from occuring once the latch is "set". Hence, it is not possible to transmit a normal control signal to place the apparatus back in the "control" mode. The invented apparatus accomplishes this function in a novel manner.

The mixer "difference" signal is amplified in the IF section of chip 400, the amplifier having automatic gain control ("AGC"), as previously discussed. The AGC signal, provided at terminal 11 of chip 400, is a DC voltage varying from the ground potential (i.e. the amplifiers are at maximum gain) and approximately 1.6 volts (i.e. the amplifier gain is at its minimum value). Normally there will be a high AGC signal whenever a relatively strong carrier is received. When no carrier is received, the AGC will be "low".

Switch S1 (FIG. 1) is a three position slide switch configured so that to change the transmitter from the "voice transmit" mode to the "control" mode, the slide switch S1 must pass momentarily through the transmitter "off" position, therefore momentarily killing the RF carrier and power to the chip 100.

Loss of the received RF signal will resul AGC to maintain constant level.

When in the "voice transmit" mode, the AGC is normally "high". With the pulse modulated carrier, the AGC will normally be relatively high. The AGC signal is provided from terminal 11 to the base of NPN transistor Q4. Therefore, with "high" AGC (i.e. with a carrier signal being received), Q4 will be "on", coupling the collector of Q4 to ground. The "low" state at node 473 is required for reference oscillator operation. By switching the transmitter through the "off" position from the "voice transmit" mode position, the AGC signal changes from the "high" state to the "low" state. When in the low state, Q4 is "off", and the potential at the collector of Q4 rises to the "high" state, biasing diode D5 "on", causing the potential at node 472 to go "high", and in turn the potential at node 473 to go "low" so that the latch is reset to the "low" state, allowing the reference oscillator to operate.

Another novel feature of the present invention is its capability to warn the operator by an audio signal that the model vehicle has been left in the "power on" state, thereby conserving battery power.

Invertor U4F is coupled to node 487, which in turn is coupled to transistors Q5 through Q8. So long as any one of these transistors is "on", the voltage at node 489 (i.e. the input to inverter U4F) will be "low" and the invertor output state "high".

A positive feedback loop comprising capacitor C22 and resistor R47 is coupled between the output of amplifier 430 and input terminal 503. Transistor Q22 couples terminal 503 to ground. With any of the transistors Q5 through Q8 turned "on", Q22 will also be "on", grounding terminal 503 and preventing the amplifier from oscillating due to the feedback loop.

When all motor drive transistors are "off", a "high" voltage is coupled to node 490, and capacitor C21 begins to charge up due to current flow through resistor R45, which is large, 10 Megohms. C21 requires a relatively long time (e.g. one minute) to charge to the "high" state due to the low current flow through R45. Once C21 is charged to the "high" state, the invertor U4F output goes "low" and turns off transistor Q22. With Q22 off, terminal 503 of the amplifier is not grounded, and the amplifier will oscillate, producing a noticeable "howl" which alerts the operator that the vehicle is still connected to the battery source. By turning on the motor M1, the capacitor C21 will quickly discharge through diode D11 and resistor R46 to ground.

No radio controlled model vehicle known in the prior art has the capability of controlling all the various functions as described above. Further, the present apparatus provides the unique capability of voice transmission in addition to a control mode, with a novel means for re-enabling the control mode.

Various modifications to the circuit of the disclosed embodiment will be apparent to those skilled in the art. For example, discrete components may be substituted for the integrated circuit chips. Other types of RF carrier modulation may also be used in conjunction with the voice transmission feature. The apparatus need not be used in wireless applications, as the principles discussed are equally applicable to providing a voice transmission capability through other transmission media.

What is claimed is:

1. A radio controller comprising:

(i) carrier signal generating means for generating a carrier signal;

(ii) first modulating signal generating means for generating a first modulating signal;

(iii) first modulating means for modulating said carrier signal in response to said first modulating signal;

(iv) second modulating signal generating means for generating a second modulating signal;

(v) second modulating means for modulating said carrier signal in response to said second modulating signal;

(vi) transmitting means for transmitting a modulated carrier signal produced by said carrier signal generating means and said first and second modulating means; and a receiver section means, said receiving section means including:

(i) receiving means for receiving said modulated carrier signal transmitted by said transmitting means;

(ii) first demodulating means coupled to said receiving means for demodulating said modulated carrier signal and producing a first demodulated signal which corresponds to said first modulating signal;

(iii) second demodulating means coupled to said receiving means for demodulating said modulated carrier signal and producing a second demodulated signal which corresponds to said second modulating signal; and (iv) demodulator control means for placing said receiver section means in a first mode in response to said modulated carrier signal produced by said carrier signal generating means, independent of said first and second demodulated signals, and for placing said receiving section means in a second mode in response to said first demodulated signal, with said first-demodulator being enabled when said receiver section means is in said first mode and said first demodulator being disabled when said receiver section means is in said second mode.

2. The radio controller of claim 1 wherein said demodulator control means places said receiving section means in said first mode in response to a change in amplitude of said transmitted carrier signal.

3. The radio controller of claim 2 wherein said change in amplitude occurs as a result of a loss of said transmitted carrier signal.

4. The radio controller of claim 2 wherein said receiving means includes automatic gain control circuitry means for producing an automatic gain control signal which is used by said demodulator control means to detect said change in amplitude of said transmitted carrier signal.

5. The radio controller of claim 4 wherein said demodulator control means includes a latch circuit which is set in response to said first demodulated signal and reset in response to said automatic gain control signal, said latch circuit maintaining said receiver section in said second mode when set and in said first mode when reset.

6. The radio controller of claim 2 wherein said second modulating signal generating means of said transmitter section includes sound detecting means for detecting sound and for producing a second modulating signal which corresponds to said detected sound and wherein said receiver section includes a sound generating means responsive to said second demodulated signal for producing sound which corresponds to said detected sound.

7. The radio controller of claim 6 wherein said second modulating means is an amplitude modulator and said second demodulator means is an amplitude demodulator.

8. The radio controller of claim 7 wherein said controller is used to control a model vehicle and said first modulating signal generating means generates first modulating signals for controlling movement of the vehicle and said receiver section means includes vehicle control means responsive to said first demodulated signals for controlling movement of the vehicle.

9. The radio controller of claim 8 wherein said first modulating means is a pulse width modulator and said first demodulating means is a pulse width demodulator.

10. The radio controller of claim 8 wherein in model vehicle includes a drive motor for propelling the vehicle, a power source and a power on/off switch and wherein said vehicle control means includes power control means coupled to said power source through said power on/off switch for controlling the drive motor in response to said first demodulated signal so as to vary the drive motor speed and wherein said radio controller further comprises warning means for providing a warning signal when said power control means is not supplying power to said drive motor when said power switch is switched on.

11. The radio controller of claim 10 wherein said warning means provides said warning signal when power is not supplied to said drive motor for a predetermined minimum time period.

12. A radio controller for receiving radio transmissions and controlling movement of a model vehicle comprising:

means for receiving a transmitting carrier signal modulated with vehicle control signals;

control signal demodulating means for recovering said control signals from said transmitted carrier signal;

a drive motor for propelling the vehicle;

a power source;

a power on/off switch;

power control means coupled to said power source through said power on/off switch and coupled to said control signal demodulating means for controlling said drive motor in response to said control signals so as to vary the drive motor speed; and warning means for providing a warning signal when said power control means is not supplying power to said drive means when said power switch is switched on.

13. The radio controller of claim 12 wherein said warning means provides said warning signal when power is not supplied to said drive motor for a predetermined minimum time period.

14. The radio controller of claim 12 wherein the transmitted carrier signal is also modulated with an audio signal and said receiving means includes means for receiving said transmitted carrier signal modulated with said audio signal and wherein said controller further comprises audio signal demodulating means for recovering said audio signal and sound generating means for generating sounds which corresponds to said recovered audio signal.

15. A radio controller for controlling toy vehicles, comprising:

a transmitting section, said transmitting section including:

(i) carrier signal generating means for generating a carrier signal;

(ii) first modulating signal generating means for generating a first modulating signal;

(iii) first modulating means for modulating said carrier signal in response to said first modulating signal;

(iv) second modulating signal generating means for generating a second modulating signal;

(v) second modulating means for modulating said carrier signal in response to said second modulating signal;

(vi) transmitting means for transmitting a modulated carrier signal produced by said carrier signal generating means and said first and second modulating means;

(vii) mode selector means for selectably enabling said first and said second modulating means, said mode selection means adapted to disable said carrier signal when disabling said second modulating means and enabling said first modulating means; and a remote receiver means located at said toy vehicle, said receiving section means including:

(i) receiving means for receiving said modulated carrier signal transmitted by said transmitting means;

(ii) first demodulating means coupled to said receiver means for demodulating said modulated carrier signal and producing a first demodulated signal which corresponds to said first modulating signal;

(iii) second demodulating means coupled to said receiving means for demodulating said modulated carrier signal and producing a second demodulated signal which corresponds to said second modulating signal; and (iv) demodulator control means for placing said receiver section means in a first mode in response to said modulated carrier signal produced by said carrier signal generating means, independent of said first and second demodulated signals, and for placing said receiver section means in a second mode in response to said first demodulated signal, with said first demodulator being enabled when said receiver section means is in said first mode and said first demodulator being disabled when said receiver section means is in said second mode, said demodulator control means operable to place said receiving section means in said first mode in respose to a change in amplitude of said transmitted carrier signal.

16. The controller of claim 15 wherein said mode selector means comprises switch means having first and second positions corresponding to said first mode and said second mode, and having a third position intermediate said first and second positions corresponding to disablement of said carrier signal.

* * * * *

UNITED STATES PATENT AND TRADEMARK OFFICE

CERTIFICATE OF CORRECTION

PATENT NO. : 4,360,808

DATED : November 23, 1982

INVENTOR(S) : Jay Smith, III; Jeffrey M. Moskin

It is certified that error appears in the above—identified patent and that said Letters Patent is hereby corrected as shown below:

Col. 4, line 11, after "by", insert --terminals 5 and 6 are used to transmit information proportional to the voltage potential at terminals 5 and 6, and not simply--.

Col. 6, line 16, change "an" to --and--.

Col. 7, line 44, change "resul" to --result--.

Col. 7, line 44, after "result", insert --in strong--.

Col. 9, Line 10, change "first-demodulator" to --first demodulator--.

Col. 9, line 57, after "in", insert --the--.

Col. 12, lines 5 and 6, change "re-spose" to --response--.

Signed and Sealed this

*First* Day of *March 1983*

[SEAL]

*Attest:*

GERALD J. MOSSINGHOFF

*Attesting Officer* *Commissioner of Patents and Trademarks*